United States Patent
Bateman et al.

(10) Patent No.: US 7,409,863 B2
(45) Date of Patent: Aug. 12, 2008

(54) PRESSURE SENSOR

(75) Inventors: David E. Bateman, Geneva, FL (US); Todd M. Bullock, Sanford, FL (US); Robert Eugene Engle, Orlando, FL (US)

(73) Assignee: Sensata Technologies Maryland, Inc., Cambridge, MD (US)

( * ) Notice: Subject to any disclaimer, the term of this patent is extended or adjusted under 35 U.S.C. 154(b) by 287 days.

(21) Appl. No.: 11/244,318

(22) Filed: Oct. 5, 2005

(65) Prior Publication Data

US 2006/0072868 A1 Apr. 6, 2006

Related U.S. Application Data (60) Provisional application No. 60/616,460, filed on Oct. 5, 2004, provisional application No. 60/616,456, filed on Oct. 5, 2004.

(51) Int. Cl.
  *G01L 9/00* (2006.01)
(52) U.S. Cl. .......................................... 73/705; 73/700
(58) Field of Classification Search .................... 73/705
  See application file for complete search history.

(56) References Cited

U.S. PATENT DOCUMENTS

| | | | |
|---|---|---|---|
| 4,543,831 A * | 10/1985 | Meyer | 73/705 |
| 4,593,191 A | 6/1986 | Alles | |
| 4,604,637 A | 8/1986 | Ruhle et al. | |
| 4,626,680 A | 12/1986 | Martens et al. | |
| 4,933,545 A * | 6/1990 | Saaski et al. | 250/227.14 |
| 5,194,723 A * | 3/1993 | Cates et al. | 250/205 |
| 5,465,772 A | 11/1995 | Sartor | |
| 5,618,361 A | 4/1997 | Colussi et al. | |
| 5,675,415 A * | 10/1997 | Akatsu et al. | 356/364 |
| 6,533,729 B1 * | 3/2003 | Khair et al. | 600/503 |
| 6,591,122 B2 * | 7/2003 | Schmitt | 600/310 |
| 6,712,769 B2 * | 3/2004 | Freund et al. | 600/503 |
| 6,723,979 B2 * | 4/2004 | Kastura | 250/231.1 |
| 6,765,196 B2 | 7/2004 | Schulz et al. | |
| 6,941,813 B2 | 9/2005 | Boukhny et al. | |
| 2002/0023826 A1 | 2/2002 | Miwa et al. | |
| 2003/0070486 A1 * | 4/2003 | Malmstrom et al. | 73/705 |
| 2003/0116702 A1 | 6/2003 | Schulz et al. | |
| 2004/0261534 A1 | 12/2004 | Boukhny et al. | |

* cited by examiner

*Primary Examiner*—Max Noori
(74) *Attorney, Agent, or Firm*—Allen, Dyer, Doppelt, Milbrath & Gilchrist, P.A.

(57) ABSTRACT

A pressure sensor includes an optical transmitter transmitting a dispersive light toward two optical receivers, all carried in a housing. Pressure changes on the housing cause the light beam to be deflected with the amount of deflection measured by the difference in light received by each of the two receivers. A processor operable with the receivers provides a pressure measurement responsive to the light beam deflection.

22 Claims, 11 Drawing Sheets

PRESSURE SENSOR

CROSS-REFERENCE TO RELATED APPLICATIONS

This application claims the benefit of U.S. Provisional Application No. 60/616,456, filed Oct. 5, 2004 and U.S. Provisional Application No. 60/616,460, filed Oct. 5, 2004, each for a "Pressure Sensor," the disclosures of which are hereby incorporated by reference herein in their entireties and all commonly owned.

FIELD OF THE INVENTION

The present invention generally relates to pressure sensors and in particular to a pressure sensor measuring changes in pressure through changes in light beam deflection.

BACKGROUND OF THE INVENTION

Typical inexpensive pressure sensing systems are of the resistive type. By way of example, a resistive tank pressure sensor may use a floater that changes the output resistance if the tank level either rises or lowers. Although resistive tank sensors are inexpensive, they are not very accurate. Tank monitors that use fluid pressure are much more accurate, but much more expensive as well. While pressure sensors have been described in the art, such as the pressure sensor of U.S. Pat. Nos. 6,765,196 and 5,618,361 employing light beam interference between a transmitter and a receiver, a need exists for a pressure sensor that can provide a continuous monitoring of pressure value changes and at a low cost to the consumer.

SUMMARY OF THE INVENTION

A pressure sensor in keeping with the teachings of the present invention may comprise an optical transmitter and at least two optical receivers carried by a housing. The optical transmitter is operable for emitting light toward the at least two optical receivers which receive the light. A light beam modifier is carried by the housing and is responsive to pressure changes on the housing for modifying the light received by each of the at least two optical receivers. A processor receives an output signal from each of the optical receivers and provides a pressure measurement responsive to the light modifying.

The light beam modifier may comprise a housing wall portion movably responsive to pressure changes thereon, and a light reflective surface operable with an inside surface of the housing wall portion within the housing, wherein the light beam emitted from the optical transmitter is directed toward the light reflective surface for an angular reflection therefrom as a reflected light beam directed toward the at least two optical receivers, and wherein movement of the wall portion results in a change in the angular reflection of the light beam and the modifying of the light received by each of the at least two optical receivers. The wall portion movably responsive to the pressure change may comprise a diaphragm. Further, a reflector may be carried on the inside surface of the housing wall portion, the reflector having the light reflective surface thereon.

Alternatively, the light beam modifier may comprise a barrier positioned in an optical path of the light beam, the barrier having a light transmitting portion therein for allowing a portion of the light emitted from the optical transmitter to be received by each of the at least two optical receivers, wherein the barrier is movably responsive to the pressure changes on the housing for movement of the light transmission portion, and thus an amount of light received by each of the at least two optical receivers. The light transmitting portion may include an aperture or a transparent portion and a semitransparent or opaque portions, as desired. The wall portion movably responsive to the pressure change may again comprise a diaphragm.

A beam splitter may be positioned for receiving the emitted light beam and directing one portion to a first receiver of the at least two optical receivers and a second portion to a second receiver thereof. The The optical transmitter may comprise a light emitting diode (LED), wherein the light beam includes a diverging light beam definable in an intensity spectrum. One LED may the diverging light beam is defined in the intensity spectrum having an angle of divergence ranging from five to twenty five degrees. A peak intensity of the divergent light beam may be measured at a location between the at least two optical receivers, to result in the pressure changes on the housing causing a movement of the peak intensity toward one of the at least two optical receivers with a negative pressure change on the housing and toward a second of the at least two optical receivers with a positive pressure change on the housing.

The processor may monitor a reference electrical signal from each of the at least two optical receivers, wherein a difference between the electrical signals is representative of the pressure change. Further, the processor may compensate for variations in aging, temperature, and quality of the optical transmitter and the receivers.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
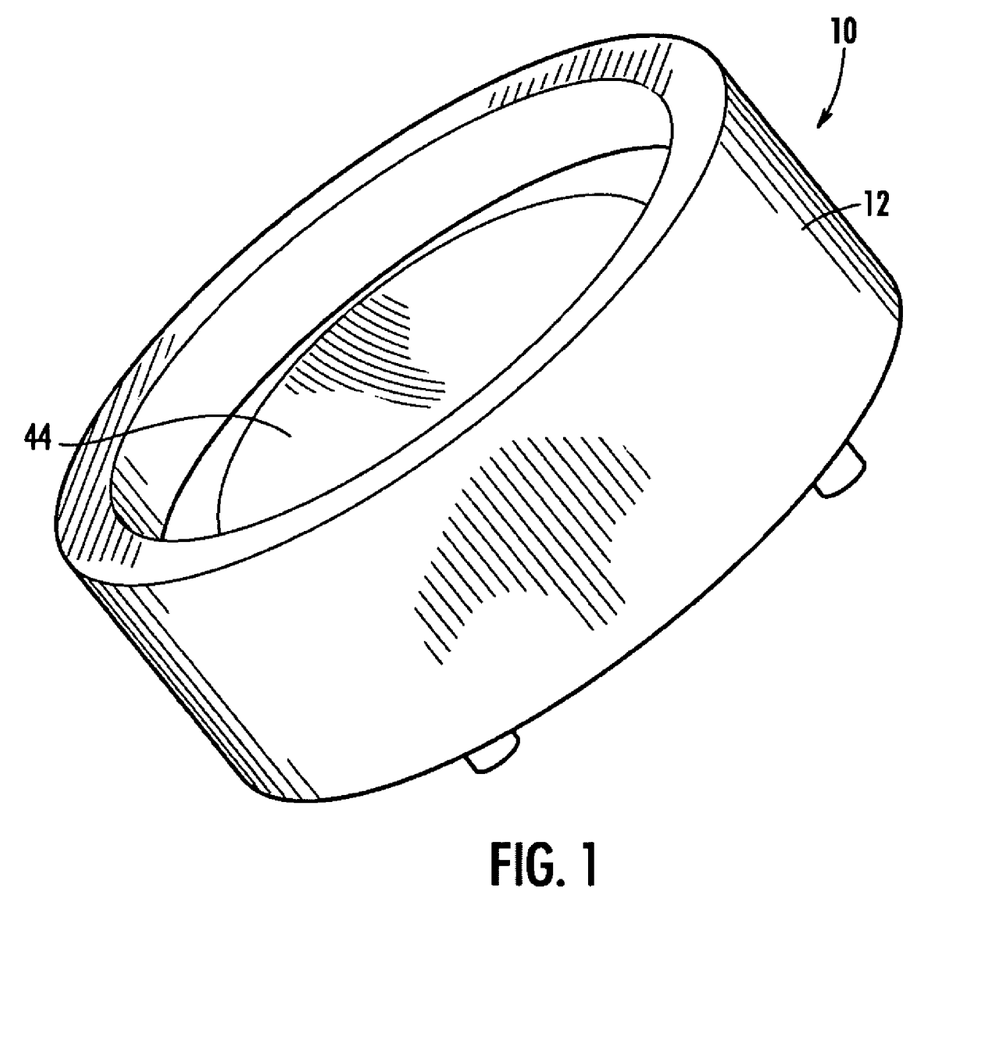
FIG. 1 is a partial perspective view of a pressure sensor in keeping with the teachings of the present invention.
Figure 2:
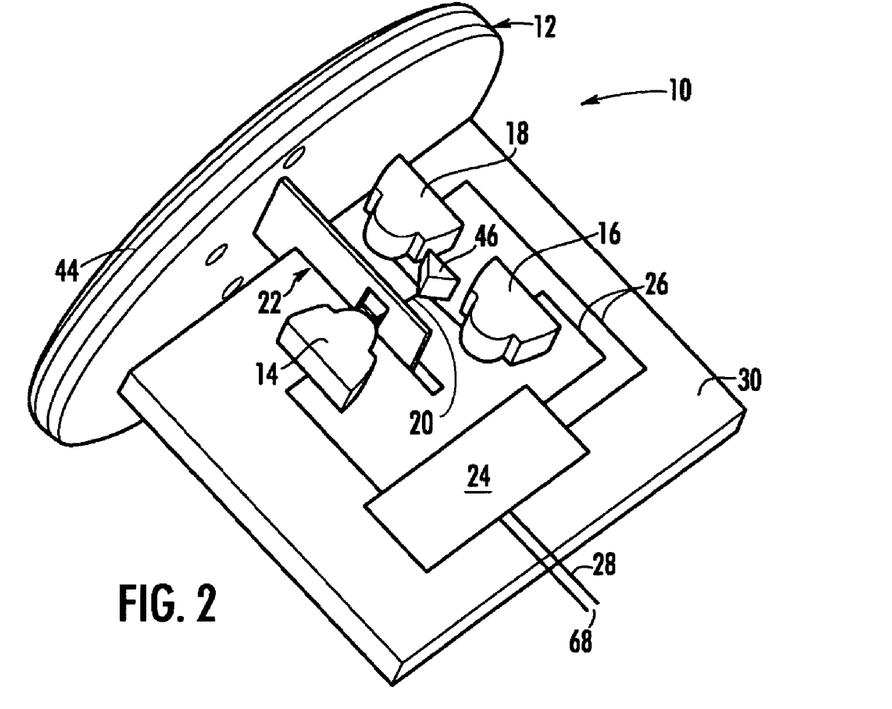
FIG. 2 is a partial diagrammatical perspective view illustrating one embodiment of the pressure sensor of FIG. 1.
Figure 3:
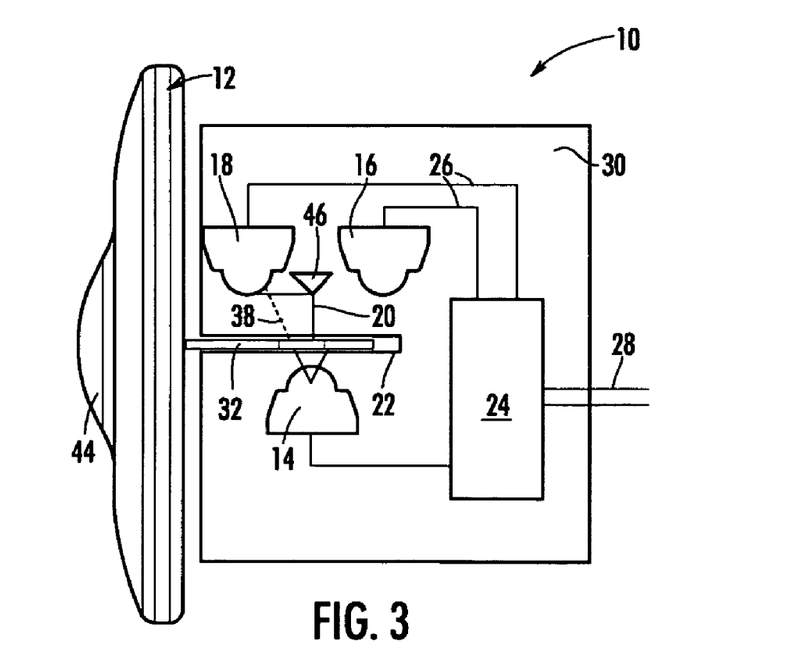
FIGS. 3 and 4 are partial diagrammatical plan views illustrating a negative and a positive pressure on a diaphragm, respectively, and thus a deflection of a light beam from one receiver to another.
Figure 4:
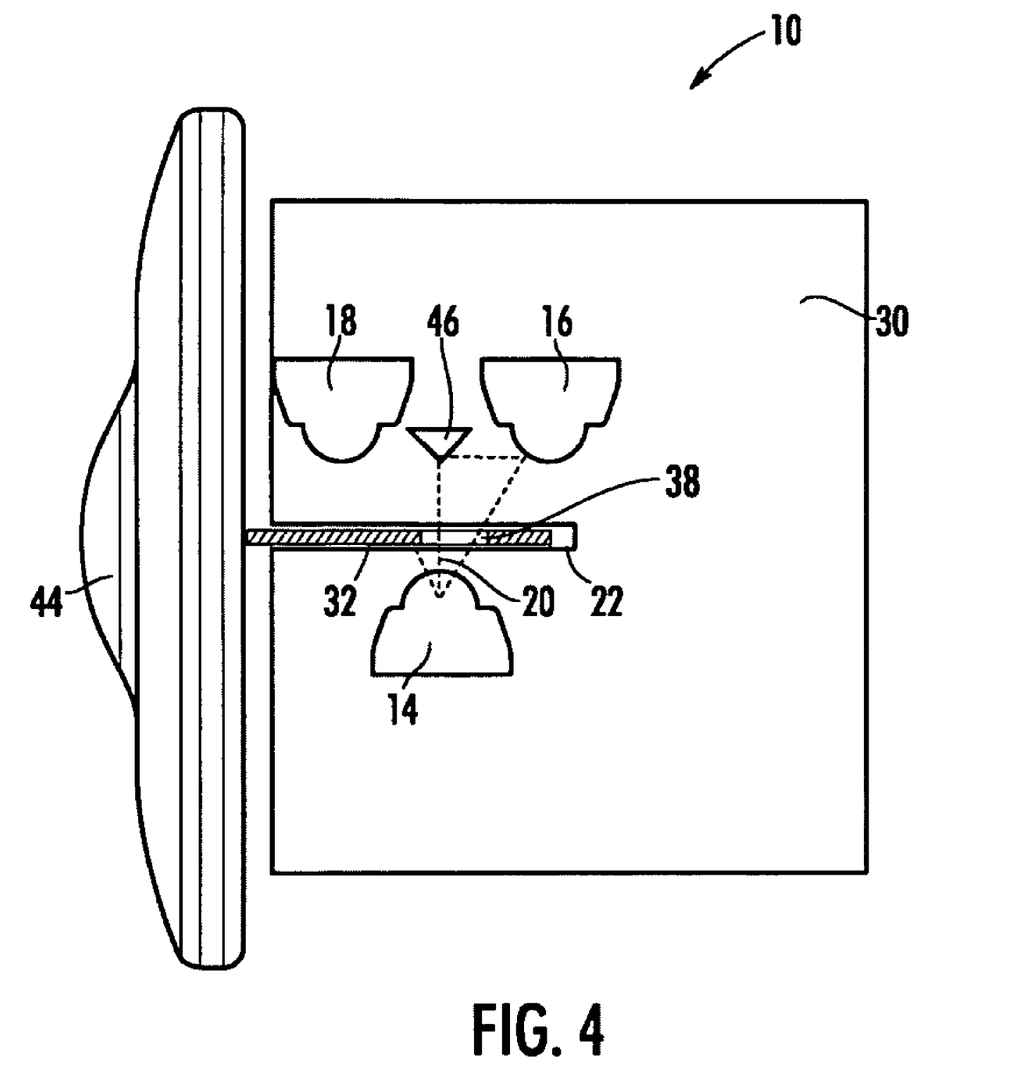
Figure 5:
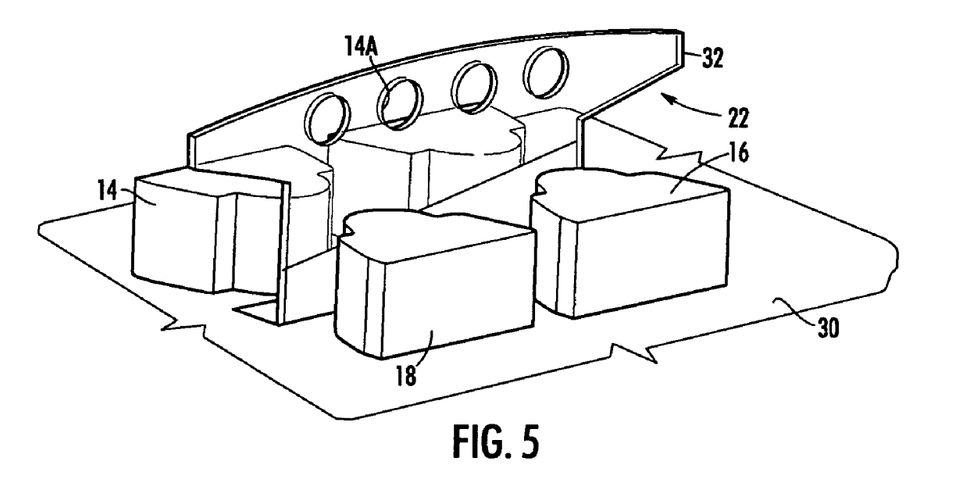
FIGS. 5 and 6 are partial diagrammatical perspective views illustrating an alternate embodiment of a barrier to the light beam.
Figure 6:
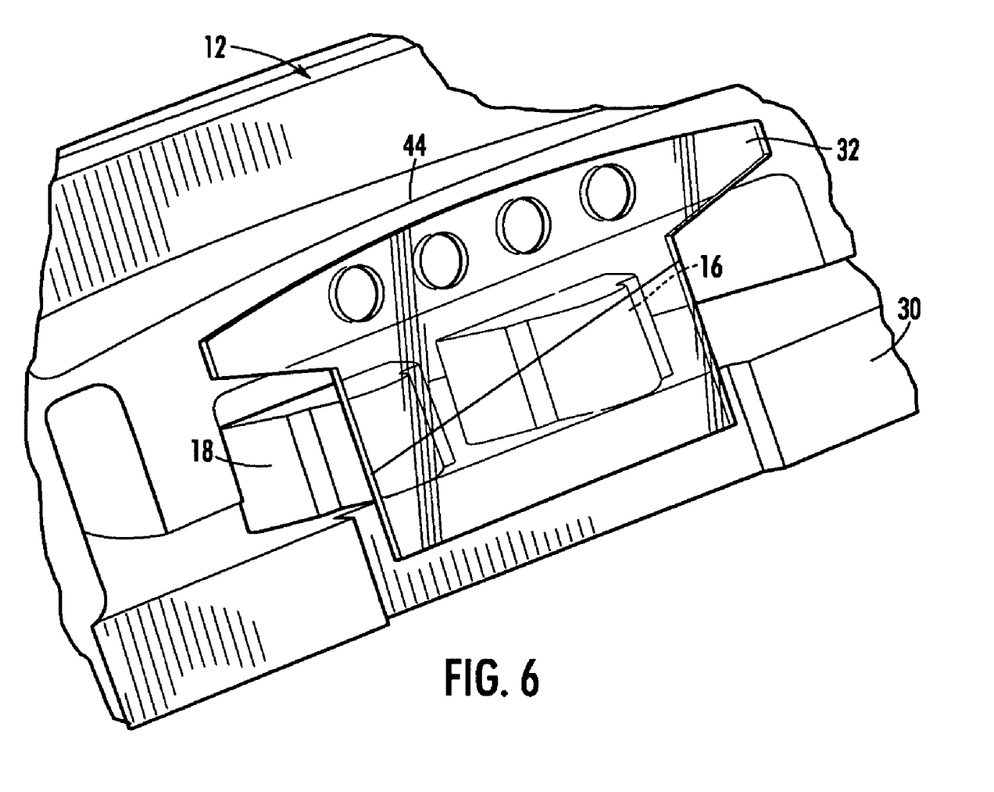
Figure 7:
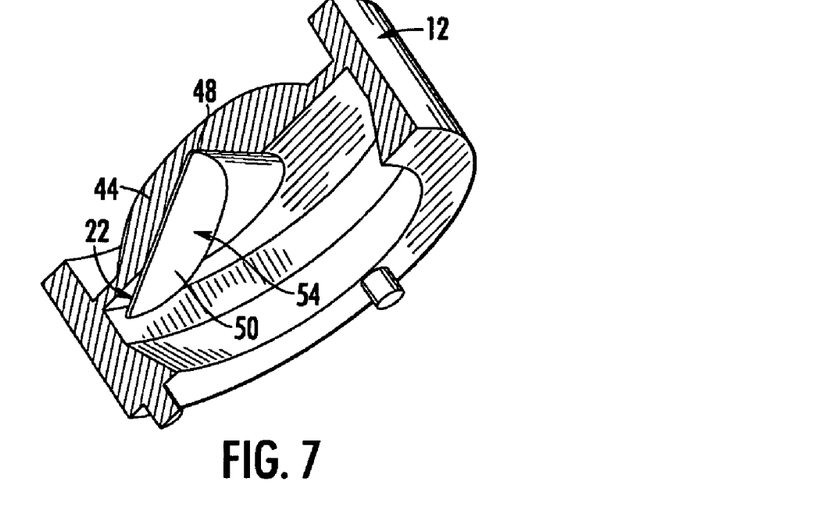
FIG. 7 is a partial diagrammatical perspective view illustrating a housing portion of the pressure sensor of FIG. 1 including a reflector carried on an inside surface of a diaphragm.

Referring initially to FIGS. 1 and 2, a pressure sensor 10 in keeping with the teachings of the present invention comprises a housing 12 includes an optical transmitter 14 and at least two optical receivers, herein referred to as a positive receiver 16 and a negative receiver 18 carried inside the housing. The optical transmitter 14 is positioned for emitting light in a beam 20 toward the two optical receivers 16, 18. A light beam modifier 22 is carried by the housing 12 and is responsive to pressure changes on the housing for modifying the light beam 20 and thus the amount of light received by each of the optical receivers 16, 18. A processor 24 receives an output signal 26 from each of the optical receivers 16, 18 and provides a pressure measurement signal 28 responsive to the light modifying. For the embodiments herein described by way of example, the electrical components are mounted on a printed circuit board (PCB) 30 carried by the housing 12. With continued reference to FIG. 2 and with reference to FIGS. 3 and 4, in one embodiment of the invention the light beam modifier 22 comprise a plunger like barrier 32 positioned in an optical path 34 of the light beam 20. In one embodiment, the barrier 32 includes a light transmitting portion 36 for allowing a portion of the light emitted from the optical transmitter to be received by each of the two optical receivers 16, 18. The barrier 32 is movably responsive to the pressure changes on the housing 12 for movement of the light transmission portion 36, and thus an amount of light received by each of the at least two optical receivers 16, 18. The light transmitting portion 36 may be an aperture 38 as illustrated with reference again to FIG. 2, or may include a transparent portion 40 and a semi-transparent or opaque portion 42 such as a filter or shaded portion, as illustrated with reference to FIGS. 5 and 6, as desired. A wall portion of the housing movably responsive to the pressure change may comprise a diaphragm, as illustrated with reference again to FIGS. 1-4, by way of example. As illustrated with reference again to FIG. 5, a second transmitter 14A may also be employed as a backup device. As illustrated with continued reference to FIG. 5, a bottom portion of the plunger styled barrier is shaded. In a starting position, the shaded portion blocks most of the light from one of the transmitter pair and receiving LEDs. As the plunger styled barrier 32 is moved downward, the shaded portion allows more and more light from the transmitting LEDs to be received by the receiving LEDs, thus changing an output signal value form the receivers. A slot in the PCB 30 allows the barrier to pass through the PCB as it travels up and down. In addition, the diaphragm 44 may contain a stop 45 that allows it to only travel down a preselected distance as positive pressure is applied to an outside surface of it.

With reference again to FIGS. 2-4, a beam splitter 46 may be positioned for receiving the transmitted light beam 20 and directing one portion to a positive receiver 16 a second portion to the negative receiver 18.

Alternatively, and as illustrated with reference to FIGS. 7-10, the light beam modifier 22 may comprise a housing wall portion 48 movably responsive to pressure changes thereon, and a light reflective surface 50 operable with an inside surface of the housing wall portion within the housing 12, wherein the light beam 20 emitted from the optical transmitter 14 is directed toward the light reflective surface 50 for an angular reflection therefrom as a reflected light beam 52 directed toward the two optical receivers 16, 18, and wherein movement of the wall portion 48 results in a change in the angular reflection of the light beam and the modifying of the light received by each of the two optical receivers. For the embodiment herein described by way of example, the wall portion 48 movably responsive to the pressure change comprise the diaphragm 44. Further, a reflector 54 is carried on the inside surface of the housing wall portion for providing the light reflective surface 50. By way of further illustration, and as illustrated with reference again to FIG. 9, light being transmitted by the transmitting LED and being reflected off of the reflector back towards the receiving LED's. The reflector is shown in a position with the diaphragm under ambient pressure conditions, by way of example. As illustrated with referenced to FIG. 10, light being transmitted by a transmitting LED and being reflected off of the reflector back towards the two receiving LEDs is shown in an under positive pressure condition with the left most receiver receiving most or the reflected light.

Figure 11:
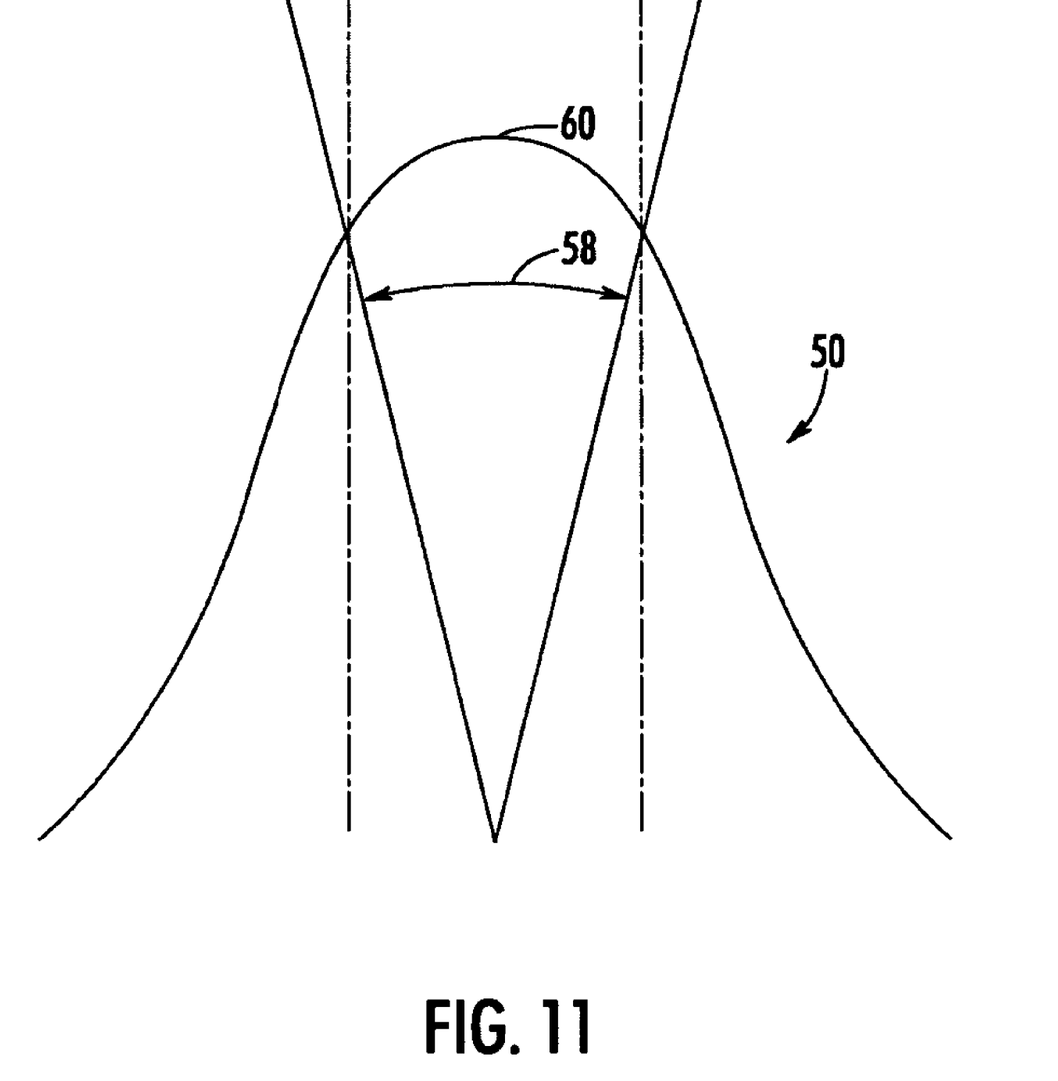
FIG. 11 is a plot of intensity versus dispersion angle for a light emitting diode useful with embodiments of the present invention.

For the embodiments herein described by way of example, and in keeping with the teachings of the present invention, the optical transmitter 14 is a light emitting diode (LED), wherein the light beam 20 is emitted in a diverging pattern, as illustrated with reference to the beam intensity spectrum 56 of FIG. 11. For such an LED selected, the intensity spectrum 56 may have an angle of divergence 58 ranging from five to twenty five degrees. A peak intensity 60 of the divergent light beam may be measured at a location between the two optical receivers 16, 18 to result in the pressure changes on the housing 12 causing a movement of the peak intensity toward the negative receiver 18 with a negative pressure change on the diaphragm 44 and toward the positive receiver 16 with a positive pressure change on the diaphragm 44, as earlier described.

With reference again to FIG. 2, by way of example, the processor 24 monitors the signal 26, a reference electrical signal from each of the two optical receivers 16, 18, wherein a difference between the electrical signals is representative of the pressure change. For the embodiments herein described by way of example, and as illustrated with reference to FIGS. 12 and 13, the processor 24 also compensates for variations in the aging, temperature, and quality of the optical transmitter 14, as well as the optical receivers 16, 18. As will come to the mind of those skilled in the art, additional receivers may be employed as desired, as well as additional transmitters as earlier described. Through software processing, a differential in output values from the start and stop position may be used to calibrate a sensor. Through software processing, a differential in output values from the start and stop position may be used to calibrate a sensor module.

Figure 12:
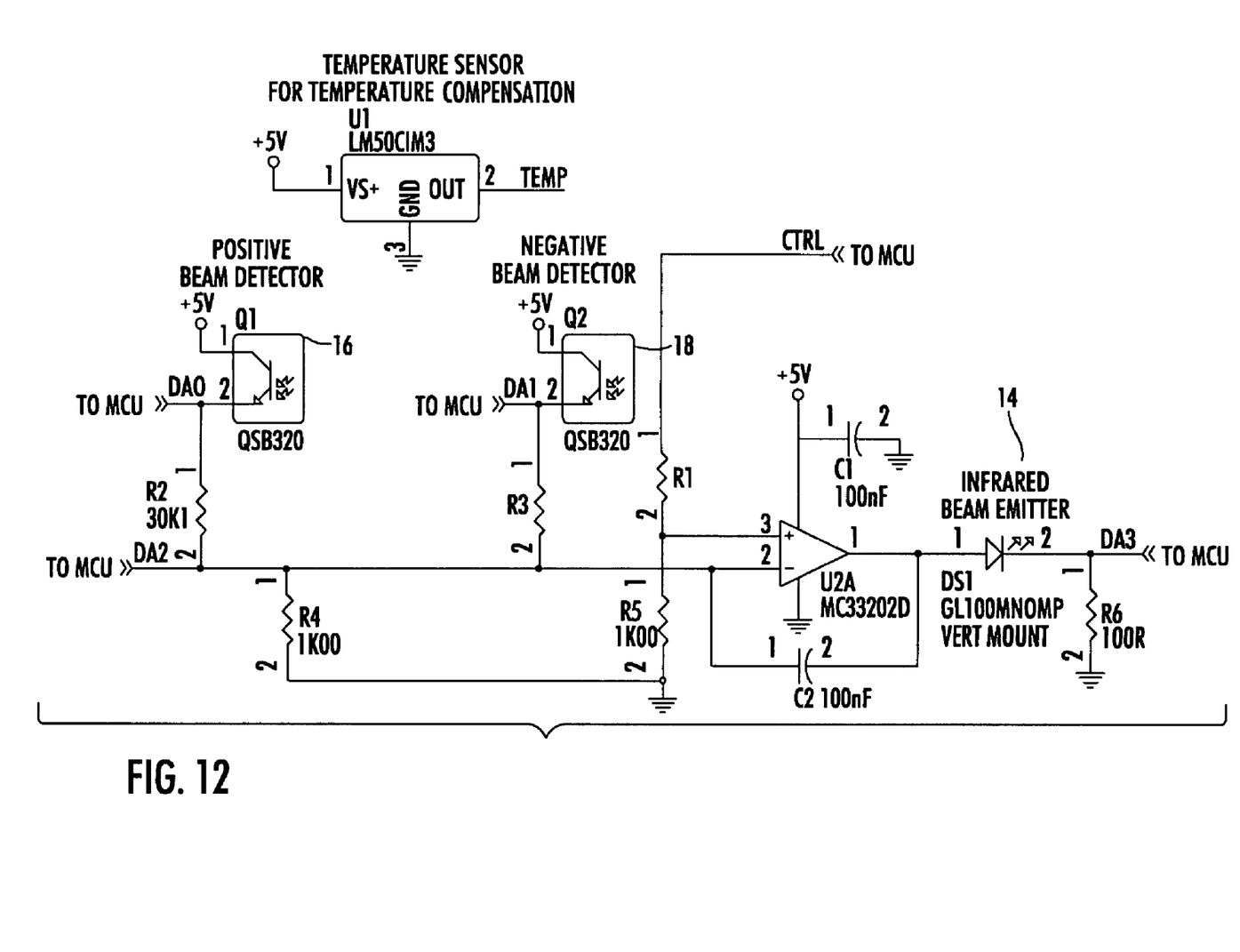
FIG. 12 is a schematic illustration of a processor operable with the optical emitter and receivers.

With reference again to the electrical schematic diagram of FIG. 12, two analog measurements are made from each beam detector herein designated, by way of example, as the positive beam receiver/detector 16 (DA0) and the negative beam receiver/detector 18 (DA1), for generally detecting positive pressure and negative pressure, respectively. These measurements are then compared to each other to determine the difference between the detected IR emissions received and then correlate movement of the diaphragm 44 earlier described with reference to FIG. 1 (through the light beam modifier 22 such as the barrier 32 and reflector 54 earlier described with reference to FIGS. 2 and 8, respectively, as a result of pressure against the diaphragm 44.

Figure 8:
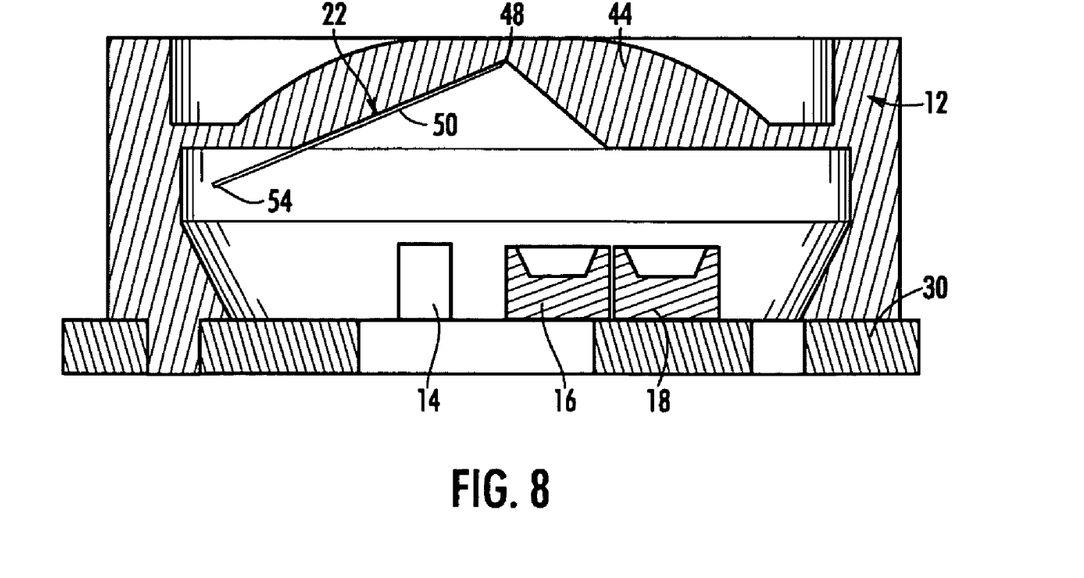
FIG. 8 is a partial diagrammatical elevation view illustrating elements of one embodiment of the pressure sensor of FIG. 1.
Figure 9:
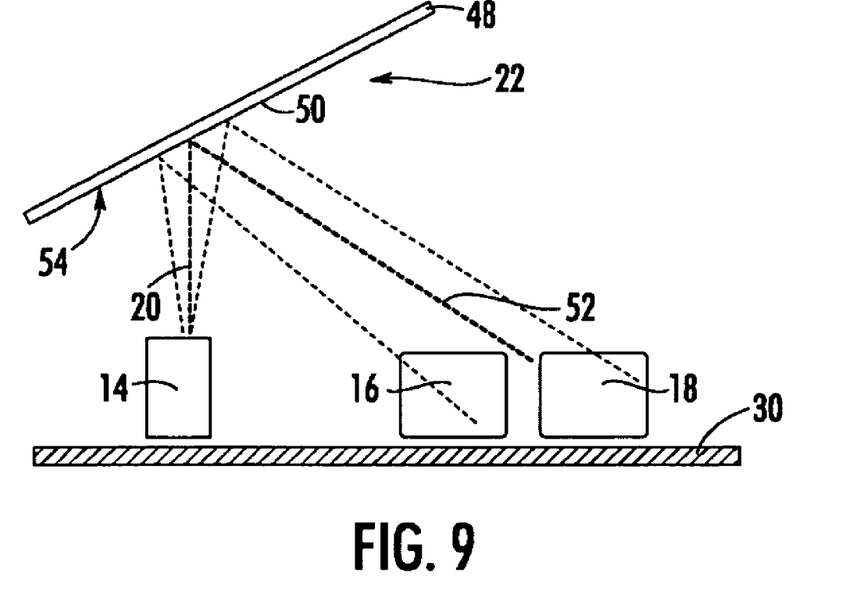
FIGS. 9 and 10 are partial diagrammatical views illustrating a deflection of an emitted light beam resulting from pressure on a housing wall.
Figure 10:
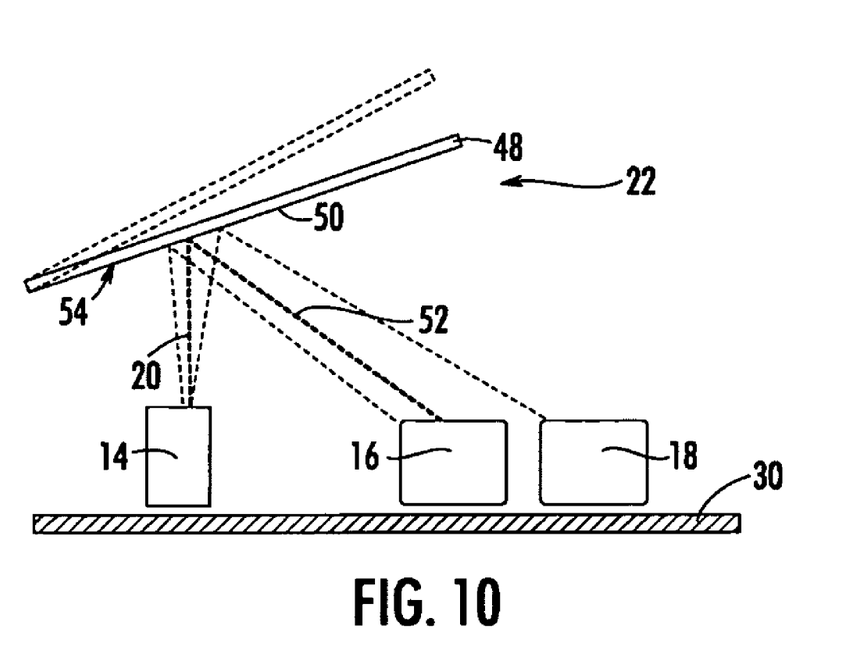

With continued reference to FIG. 12, DA2 is a summed measurement of the signal output from the two receivers, the positive receiver 16 (DA0) and the negative receiver 18 (DA1), as earlier described in alternate embodiments made to FIGS. 2 and 8, by way of example. The summed signal can be maintained at a constant value by "servoing" the sunned signal from the two receivers 16, 18 and providing a feedback to the optical transmitter 14, thus allowing a desirable linear measurement for conversion of the light measured to a pressure value. With continued reference to FIG. 12, by way of example, the summed signal from the receivers 16, 18 (taken through the resistors R2 and R3) is also sent to an operational amplifier (U2A) for comparison to a normalized or control signal (CTRL). In this way, non-linear effects can be compensated. By way of example, as the dispersed light beam is moved from one receiver toward another, thus providing a non-linear receiving of light, servoing allows the summed signal to be held constant by signaling the transmitter to modify its light output. By servoing the summed signals from the two receivers, the photons of light received by the two receivers will always be constant, thus compensating for any non-linear output from the receivers. By way of example, if hot spots are created by the peak output of the beam, the transmitter reduces is output accordingly, or increases the output if the lower Intensity portions contact the receivers. This servoing of the optics permits a compensating for variations in the non-linear light transmission thus providing a desirable linear compensation having greater accuracy, but also allows for a compensation of non-linear effects brought about by aging, temperature, and quality differences in the IR components. By way of further example, the summed signal will be modified to accommodate a typical non-linear gain change resulting from a temperature effect throughout operation of the pressure sensor. As will be understood by those skilled in the art, servoing as used herein makes reference to a servomechanism detection technique or servo devices that may constantly detect a variable, and adjust a mechanism to respond to changes.

Figure 13:
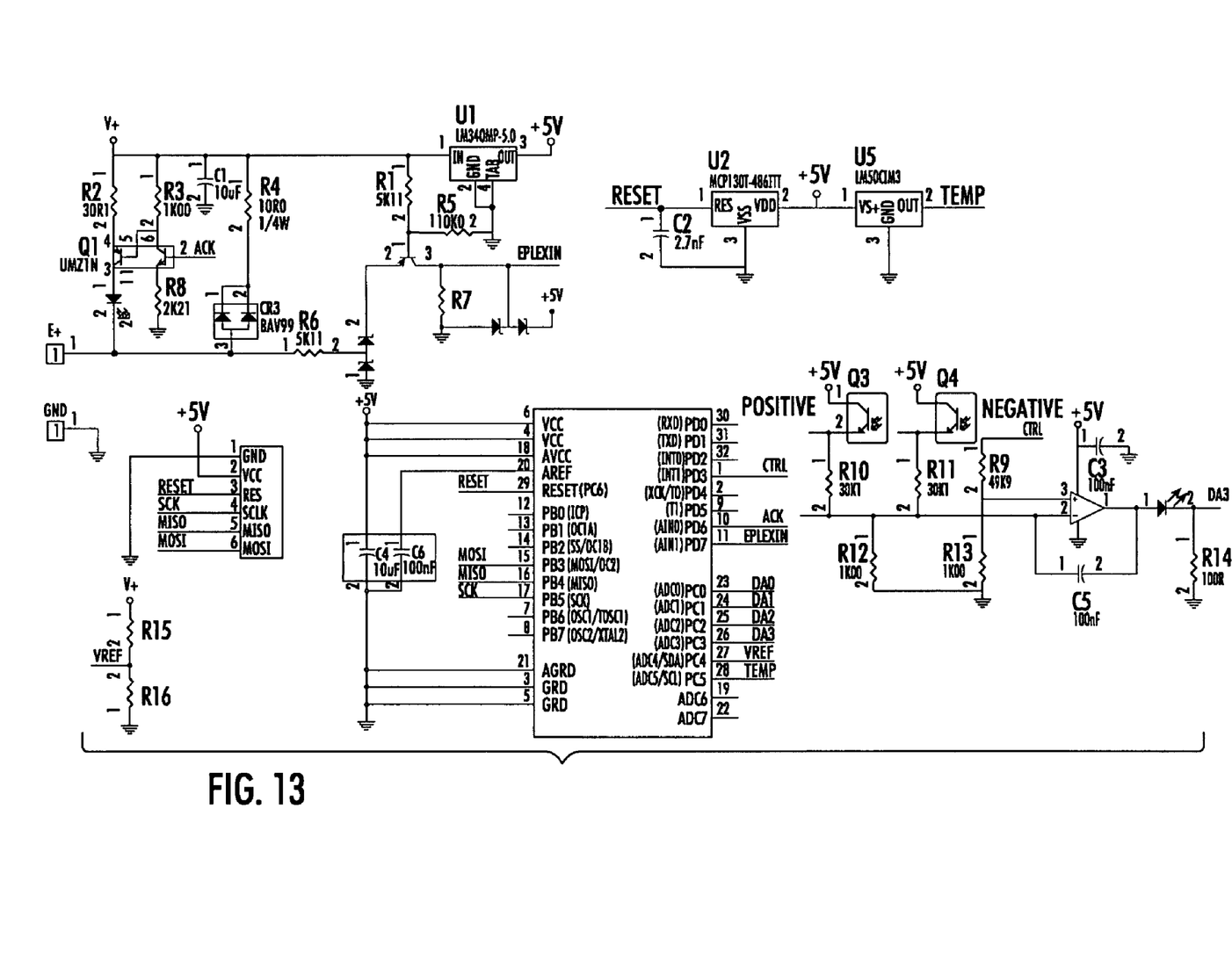
FIG. 13 is detailed schematic illustration of a processor of FIG. 12 identifying elements that may be selected for use in fabricating embodiments of the invention herein described by way of example.
Figure 14:
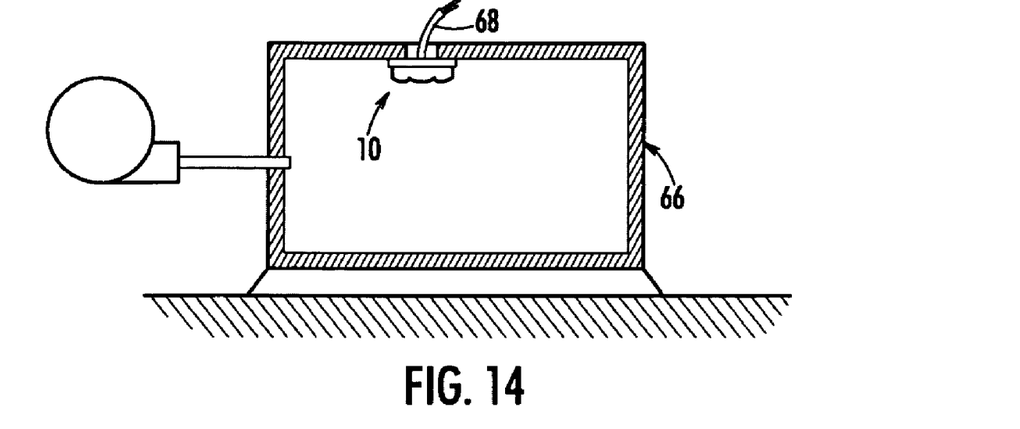
FIGS. 14, 15, and 16 are diagrammatical illustrations of pressurized and liquid storage tanks employing the pressure sensor of the present invention.
Figure 15:
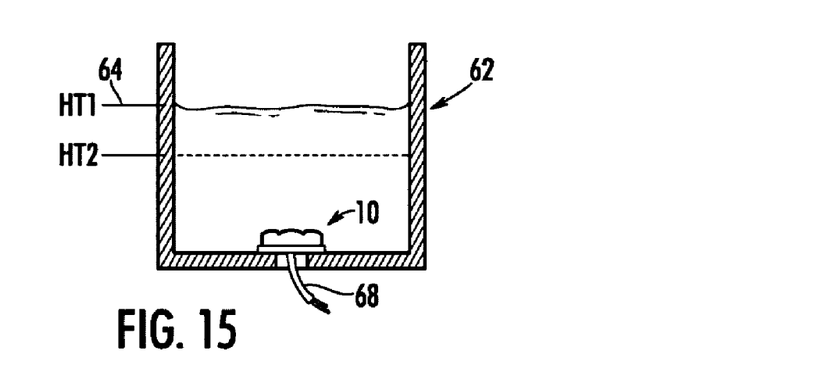
Figure 16:
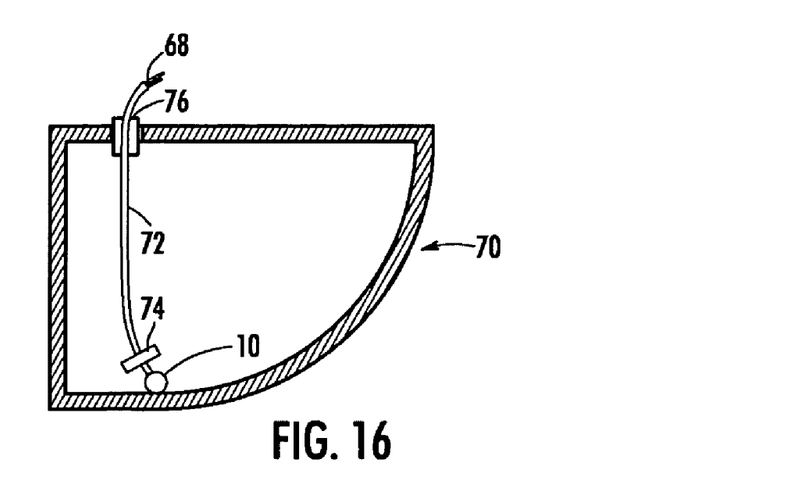

With continued reference to FIG. 12 and to FIG. 13, the current through the IR emitter (DS1) is measured at DA3 and provides a feedback to the microprocessor about how hard the IR emitter is being driven to maintain the constant number of photons measured at DA2. Control of the IR emitter (DS1) is maintained by the CTRL signal to the microprocessor. Mechanical temperature compensation of the flexible diaphragm material is accomplished by temperature sensor U1 to account for any variation in rigidity of materials due to temperature fluctuations. With the embodiments herein described, the pressure sensor 10 may be used in various conditions including, by way of example, a fluid storage tank 62 to determine a liquid level 64, or a pressurized tank 66 to determine pressure within the tank, as illustrated with reference to FIGS. 14 and 15. With the sensor 10 herein described, and as illustrated with reference again to FIG. 2, data out and power to the sensor is provided through a wire pair 68. By way of further example, and as is well known for traveling vessels such as boats and recreational vehicles, a tank 70 for use in storing drinking water, grey or black water, or fuel can take on various shapes to fit with the vessel of surroundings, as illustrated with reference to FIG. 16. By placing the pressure sensor 10 at the end of a flexible tube 72, the tube may be directed to an appropriate portion of the tank wherein pressure measurements can then be calibrated fro such a shaped tank. The flexible tube 72 may have a weighted end 74 to allow the sensor to be desirably positioned after being directed thought an existing opening 76 in the tank 70. As above described, all that is then necessary is to connect to the wire pair 68 for appropriate power supplying and data signaling. With such, the processor can calibrate the sensor for odd shaped tanks or containers.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A pressure sensor comprising:
   a housing;
   an optical transmitter carried by the housing, the optical transmitter operable for emitting light;
   at least two optical receivers carried by the housing for receiving light emitted from the optical transmitter;
   a light beam modifier carried by the housing and responsive to pressure changes thereon for modifying the light received by each of the at least two optical receivers, wherein the light beam modifier comprises a barrier positioned in an optical path of the light beam, the barrier having a light transmitting portion therein for allowing a portion of the light emitted from the optical transmitter to be received by each of the at least two optical receivers, wherein the barrier is movably responsive to the pressure changes on the housing for movement of the light transmission portion, and thus an amount of light received by each of the at least two optical receivers; and
   a processor operable for receiving an output signal from each of the optical receivers and providing a pressure measurement responsive to the light modifying.

2. A pressure sensor according to claim 1, wherein the light beam modifier comprises:
   a housing wall portion movably responsive to pressure changes thereon; and
   a light reflective surface operable with an inside surface of the housing wall portion within the housing,
   wherein the light beam emitted from the optical transmitter is directed toward the light reflective surface for an angular reflection therefrom as a reflected light beam directed toward the at least two optical receivers, and
   wherein movement of the wall portion results in a change in the angular reflection of the light beam and the modifying of the light received by each of the at least two optical receivers.

3. A pressure sensor according to claim 2, wherein the wall portion movably responsive to the pressure change comprises a diaphragm.

4. A pressure sensor according to claim 2, further comprising a reflector carried on the inside surface, the reflector having the light reflective surface thereon.

5. A pressure sensor according to claim 2, further comprising a beam splitter positioned for receiving the reflected light beam and directing one portion to a first receiver of the at least two optical receivers and a second portion to a second receiver thereof.

6. A pressure sensor according to claim 1, wherein the light transmitting portion includes an aperture.

7. A pressure sensor according to claim 1, wherein the light transmitting portion comprises a transparent portion and at least one of a semitransparent portion and an opaque portion.

8. A pressure sensor according to claim 1, wherein the wall portion movably responsive to the pressure change comprises a diaphragm.

9. A pressure sensor according to claim 1, further comprising a beam splitter positioned for receiving the emitted light beam and directing one portion to a first receiver of the at least two optical receivers and a second portion to a second receiver thereof.

10. A pressure sensor comprising:
a housing;
an optical transmitter carried by the housing, the optical transmitter operable for emitting light;
at least two optical receivers carried by the housing for receiving light emitted from the optical transmitter;
a light beam modifier carried by the housing and responsive to pressure changes thereon for modifying the light received by each of the at least two optical receivers,
wherein the optical transmitter comprises a light emitting diode (LED), and wherein the light beam includes a diverging light beam definable in an intensity spectrum, and wherein a peak intensity of the divergent light beam is measured at a location between the at least two optical receivers, and wherein the pressure changes on the housing result in a movement of the peak intensity toward one of the at least two optical receivers with a negative pressure change on the housing and toward a second of the at least two optical receivers with a positive pressure change on the housing; and
a processor operable for receiving an output signal from each of the optical receivers and providing a pressure measurement responsive to the light modifying.

11. A pressure sensor according to claim 10, wherein the diverging light beam is defined in the intensity spectrum as having a range of divergence angles.

12. A pressure sensor comprising:
a housing;
an optical transmitter carried by the housing, the optical transmitter operable for emitting light;
at least two optical receivers carried by the housing for receiving light emitted from the optical transmitter;
a light beam modifier carried by the housing and responsive to pressure changes thereon for modifying the light received by each of the at least two optical receivers; and
a processor operable for receiving an output signal from each of the optical receivers and providing a pressure measurement responsive to the light modifying,
wherein the processor sums an output signal from each of the at least two receivers and compares a resulting summed signal to a reference signal, and
wherein the summed signal is compared to a control signal delivered to the optical transmitter for modifying an output from the optical transmitter for maintaining the summed signal at a constant value, thus providing a linear conversion of the summed signal from the optical receivers to a pressure value representative of the pressure change.

13. A pressure sensor comprising:
a housing;
an optical transmitter carried by the housing, the optical transmitter operable for emitting light;
at least two optical receivers carried by the housing for receiving light emitted from the optical transmitter; and
a light beam modifier carried by the housing and responsive to pressure changes thereon for modifying the light received by each of the at least two optical receivers, the light beam modifier including a light reflective surface operable with an inside surface of the housing, wherein the light beam emitted from the optical transmitter is directed toward the light reflective surface for an angular reflection therefrom as a reflected light beam directed toward the at least two optical receivers, and wherein movement of the wall portion results in a change in the angular reflection of the light beam and the modifying of the light received by each of the at least two optical receivers; and
a processor carried by the housing for providing a pressure measurement responsive to the light modifying, the processor summing an output signal from each of the at least two receivers and comparing a resulting summed signal to a reference signal, wherein the summed signal is compared to a control signal delivered to the optical transmitter for modifying an output from the optical transmitter for maintaining the summed signal at a constant value, thus providing a linear conversion of the summed signal from the optical receivers to a pressure value representative of the pressure change.

14. A pressure sensor according to claim 13, wherein the wall portion movably responsive to the pressure change comprises a diaphragm.

15. A pressure sensor according to claim 13, further comprising a reflector carried on the inside surface, the reflector having the light reflective surface thereon.

16. A pressure sensor according to claim 13, further comprising a beam splitter positioned for receiving the reflected light beam and directing one portion to a first receiver of the at least two optical receivers and a second portion to a second receiver thereof.

17. A pressure sensor comprising:
a housing;
an optical transmitter carried by the housing, the optical transmitter operable for emitting light;
at least two optical receivers carried by the housing for receiving light emitted from the optical transmitter; and
a light beam modifier carried by the housing and responsive to pressure changes thereon for modifying the light received by each of the at least two optical receivers, wherein the light beam modifier includes a barrier positioned in an optical path of the light beam, the barrier having a light transmitting portion therein for allowing a portion of the light emitted from the optical transmitter to be received by each of the at least two optical receivers, wherein the barrier is movably responsive to the pressure changes on the housing for movement of the light transmission portion, and thus an amount of light received by each of the at least two optical receivers.

18. A pressure sensor according to claim 17, A pressure sensor according to claim 16, further comprising a processor carried by the housing for providing a pressure measurement responsive to the light modifying, the processor summing an output signal from each of the at least two receivers and comparing a resulting summed signal to a reference signal, wherein the summed signal is compared to a control signal delivered to the optical transmitter for modifying an output from the optical transmitter for maintaining the summed signal at a constant value, thus providing a linear conversion of the summed signal from the optical receivers to a pressure value representative of the pressure change.

19. A pressure sensor according to claim 17, wherein the light transmitting portion includes an aperture.

20. A pressure sensor according to claim 17, wherein the light transmitting portion comprises a transparent portion and at least one of a semitransparent portion and an opaque portion.

21. A pressure sensor according to claim 17, wherein the wall portion movably responsive to the pressure change comprises a diaphragm.

22. A pressure sensor according to claim 17, further comprising a beam splitter positioned for receiving the emitted light beam and directing one portion to a first receiver of the at least two optical receivers and a second portion to a second receiver thereof.

* * * * *